2,900,717
FRUIT PEELER
Raymond Byrd and Wade Byrd, Grant, Va.

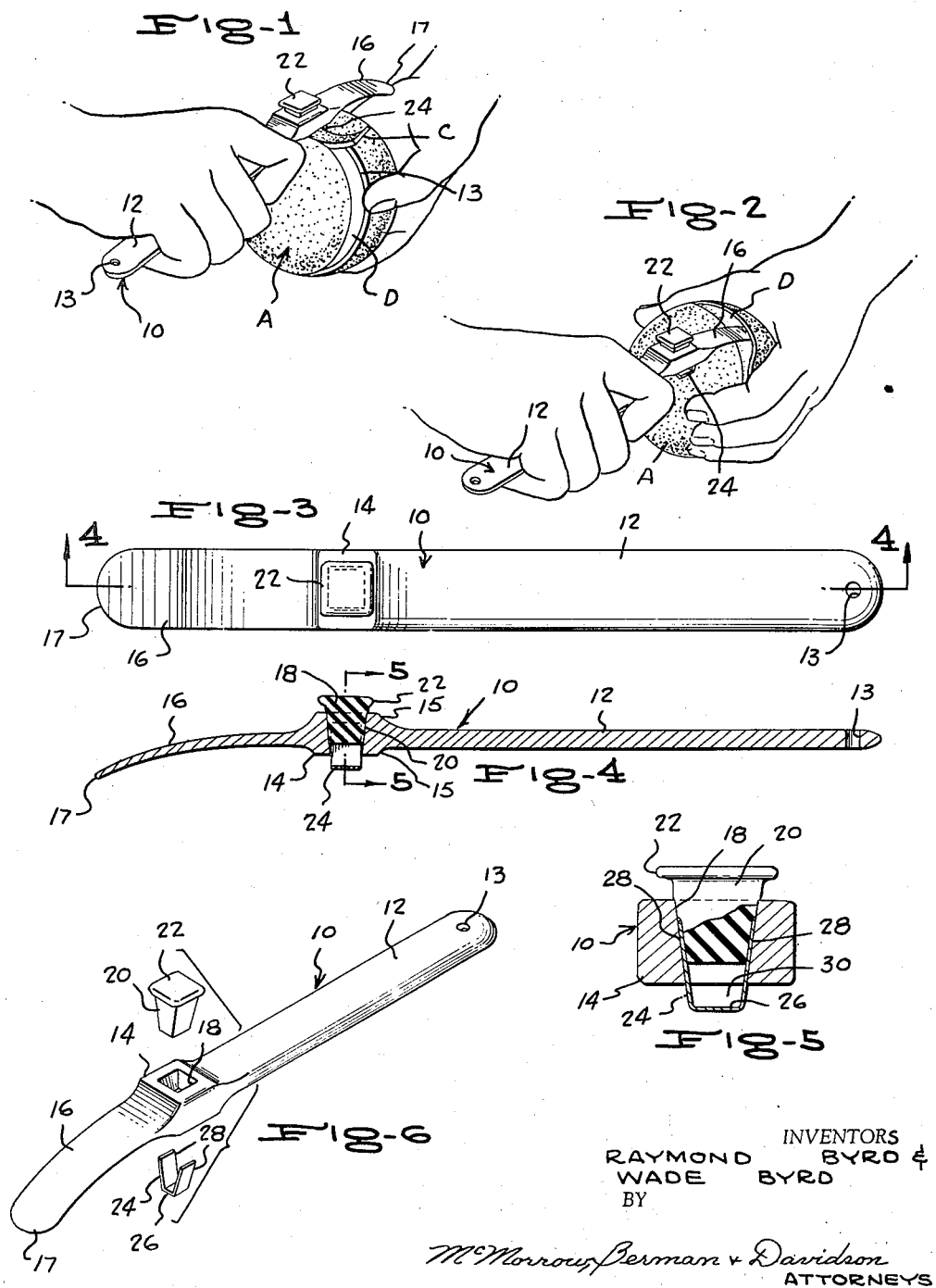

Application June 6, 1958, Serial No. 740,339

5 Claims. (Cl. 30—24)

This invention relates to fruit peelers of the type that comprises a relatively small, knife-like tool held in the hand.

One important object of the present invention is to provide an improved peeler having a particular shape of blade that is especially well designed to facilitate entry into the skin of a citrus fruit.

Another object is to so form the blade that not only will entry thereof into the orange skin be facilitated, but also, the shape of the blade will be such as to facilitate cutting of the skin in the form of a strip, responsive merely to travel of the blade about the circumference of the orange or other object being peeled.

Another object is to provide a means of detachably connecting the blade to the main portion or handle of the device, which means will be of an improved form designed especially for quickly but securely connecting the blade to the handle.

A further object is to so form the means referred to immediately above that it will also facilitate removal of a blade and replacement thereof by a new blade, whenever necessary following dulling of a particular blade.

A further object is to provide an improved, curved end portion on the handle, so shaped as to be swiftly entered between the skin and the pulp through the space left by removal of the strip referred to previously herein.

A further object is to so design the connecting means as to facilitate adjustment of the bottom portion of the blade toward and away from the adjacent surface of the knife, thus to provide for a depth adjustment of the blade, which depth adjustment can be selected according to the thickness of the skin of the particular type of fruit that is being peeled.

Other objects and advantages will become apparent from a consideration of the following description and the appended claims in conjunction with the accompanying drawings wherein:

Figure 1 is a perspective view showing the device used during the peeling of an orange, the blade being extended into the orange to cut away a strip of the orange skin in the form of a peeling;

Figure 2 is a view like Figure 1 in which the curved outer end portion of a knife element has been inserted between the skin and the pulp, following removal of the strip shown in Figure 1;

Figure 3 is a top plan view of the tool on an enlarged scale;

Figure 4 is a longitudinal sectional view substantially on line 4—4 of Figure 3, the blade being turned ninety degrees from its Figure 1 position;

Figure 5 is a transverse sectional view substantially on line 5—5 of Figure 4, the scale being enlarged above that of Figure 4; and Figure 6 is an exploded perspective view of the tool per se, the scale being smaller than that of Figure 3 but enlarged in respect to the scale used in Figures 1 and 2.

Referring to the drawing in detail, the tool comprising the present invention has been generally designated 10 and includes an elongated, straight, flat, rigid, wide handle 12 one end of which may be rounded and provided with an opening 13 to facilitate suspension of the handle from a suitable support means when the device is not in use.

Handle 12, at its other end, merges into and is integral with a thickened portion 14, the width of which matches that of the handle. Portion 14 in actuality is comprised of a pair of generally rectangular bosses 15 disposed on opposite faces of the device, to define the thickened portion at the end of the handle 12.

Integral with and extending forwardly from the thickened portion 14 is an elongated, wide, gradually longitudinally curved knife element 16.

The knife element 16, at its inner end, is disposed in the plane of the handle 12, but due to the longitudinal curvature of the knife element, said knife element gradually curves out of said plane. Knife element 16 at its distal end is rounded off, having a curved end edge extending through substantially 180 degrees and designated at 17. The knife element, though being of constant width up to the rounded distal end, is gradually, progressively reduced in thickness as shown to best advantage in Figure 4. At its curved end edge 17, the knife element is of somewhat blade-like form, though not being sharpened to a fully sharp, razor-like edge.

Centrally formed in the enlarged portion 14 is a square opening 18. This extends through the full thickness of the portion 14, so that the opening opens upon the flat faces of the bosses 15. Opening 18 is progressively reduced in cross-sectional area in a direction from one to the other end of the opening, though being of square cross section when viewed at any point along its length.

A wedge-like plug 20 of rubber material or the like is insertable in the opening, and when so inserted is compressed in the opening. Plug 20 has a body portion of square cross section at all points along its length, complementary to the cross-sectional shape of the opening 18. However, in its uncompressed condition, the body portion 20 is slightly greater in area than corresponding portions of the opening 18. This produces a true wedging action, that is, when the smaller end of the body portion of the plug is entered into the larger end of the opening, movement of the plug to an increasingly greater depth in the opening will cause the plug to be compressed more and more, so that in effect it is tightly squeezed into the opening and exerts pressure radially outwardly of the plug in all directions against the walls of the opening.

Plug 20, at its larger end, is provided with a flattened head or collar 22, to facilitate grasping of the plug during its insertion or removal.

Designated at 24 is a U-shaped blade, having a bight portion 26 and legs 28. The blade is formed from a single piece of thin, flat metal material, the thinness of which is adapted to impart a cutting edge to opposite edges of the bight portion and legs. However, of course the opposite edges of said bight portion and legs could be sharpened as much as desired, to insure that the blade will readily penetrate the skin of the orange, and will cut said skin in the desired manner.

Legs 28 diverge in a direction upwardly from the bight portion 26, correspondingly to the angularity of the opposed walls of opening 18 (see Figure 5).

In use, the blade is inserted into the opening, and will move downwardly therein until the bight portion 26 is spaced downwardly from the thickened portion 14 a distance roughly approximating the thickness of the skin of the orange. Then, the plug 20 is entered into the opening, and extending between the legs, will wedge the legs tightly in the opening, that is, the legs will be clampably engaged between the plug and the wall of the opening. This securely engages the blade in the opening. Of course, the square shape of the opening, taken with the particular, illustrated shape of the blade, will hold the blade against turning in the opening about an axis perpendicular to the length of the handle. Further, the blade will be held against lateral tilting or against tilting in a fore-and-aft direction, that is, in a direction longitudinally of the handle.

If one were to desire to adjust the distance between bight portion 26 and the adjacent face of the thickened portion 14, one need merely, after removal of the plug, move the bight portion toward or away from the adjacent face of the thickened portion 14. After such movement has been effected, the plug can be re-entered and wedged in the opening once again. This provides a desirable adjustment feature, designed to cause the blade to penetrate the orange only to the extent of the thickness of the skin and with minimum disturbance to the pulp itself.

Due to the shape of the blade and due to the fact that the plug when in full wedging position does not extend the full length of the opening, there is an open space 30 defined between bight portion 26 and the adjacent face of the thickened portion 14. Space 30 is bounded at its opposite sides by legs 28.

In use of the tool, the orange A is held in one hand as shown, the tool being held in the other hand. The blade 24 is then applied, bight portion 26 extending into the skin of the orange. The orange is turned, or alternatively, the blade is moved about the circumference of the orange. This causes the blade to cut away a segment of the skin B of the orange, producing a peeling C, the peeling passing through the space 30. In other words, the exposed portions of the legs 28 cut through the skin along parallel paths extending circumferentially of the orange, while the bight portion 26 lifts the skin between said paths upwardly out of engagement with the pulp.

This produces a space D extending the full circumference of the orange, and as shown in Figure 2, one now extends the distal end portion of the knife element 16 through said space, inserting the same between the skin and the pulp of the orange. The orange is again turned, and by lightly lifting the skin from the pulp, the skin is cleanly separated from the pulp, without damage to the pulp or loss of juice, and in a minimum time.

As will be apparent, the provision of a square opening permits the blade 24 to be turnable ninety degrees from the position thereof when used as in Figure 1. In Figure 1 (see also Figure 2) the cutting edges of the bight portion and legs of the blade parallel the longitudinal median line of the handle. In Figures 3-6, the blade 24 has been turned ninety degrees, so that the cutting edges of the bight portion and legs 28 are now extended normally to said longitudinal median line. The arrangement permits one to operate the tool with the handle being shifted in the direction of its length while blade 24 is in use. In these circumstances, the blade would be positioned as in Figures 4 and 5. Further, by swiftly turning the blade ninety degrees from its Figure 1 position, the blade 24 will now be disposed so as not to accidentally cut into the skin or rind of the fruit, during the second operation shown in Figure 2.

The tool, as will be readily seen, is a light, yet easily manufactured, strong article, capable of production at comparatively low cost. Yet, the tool is characterized by increased efficiency, particularly by reason of the specially designed shape of the blade and of the adjacent portion of the device. Still further, the improved means of connecting the blade to the thickened portion 14, and for effecting adjustments in the blade position, it is a desirable feature of the invention.

It is believed apparent that the invention is not necessarily confined to the specific use or uses thereof described above, since it may be utilized for any purpose to which it may be suited. Nor is the invention to be necessarily limited to the specific construction illustrated and described, since such construction is only intended to be illustrative of the principles of operation, and the means presently devised to carry out said principles, it being considered that the invention comprehends any minor change in construction that may be permitted within the scope of the appended claims.

What is claimed is:

1. In a fruit peeler, a handle; a blade support portion on the handle; a blade carried by said portion; and means for holding the blade connected to said portion, said portion having an opening therethrough, said blade being engaged in said opening, the blade being of U-shape and including a bight portion spaced outwardly from said portion and sharpened to penetrate the skin of the fruit, said blade including legs, said legs for part of their lengths being exposed adjacent the bight portion for cutting the skin along parallel paths, with the bight portion cutting the skin away from the pulp of the fruit between said paths, said opening being tapered in a direction from one toward its other end, the legs of the blade being extended in converging relation complementarily to the taper of the opening, said means comprising a plug wedging the legs in the opening in selected positions to which the bight portion is adjusted toward said first named position.

2. In a fruit peeler, a construction as in claim 1, wherein said opening and plug are of a square cross section, whereby said blade may be turned ninety degrees in the opening and wedged therein in each position to which it is turned.

3. In a fruit peeler, a construction as in claim 2, wherein said legs are of a width approximately equal to the distance between two opposite sides of the opening measured along a third side thereof at the smaller end of the opening.

4. In a fruit peeler, a handle; a blade support portion thereon having an opening therethrough; a U-shaped blade removably positioned in the opening, said blade including legs engageable for part of their lengths against opposite walls of the opening in selected positions of adjustment longitudinally of the opening, the remaining parts of the legs projecting out of the opening to make parallel cuts in the skin of a fruit and thereby cut a strip out of said skin, the blade including a bight portion connected between the projecting parts of the legs to cut the strip away from the pulp of the fruit; and a resiliently compressible plug removably engageable in its compressed condition in said opening to lockably engage the legs in the opening between the plug and said opposed walls.

5. In a fruit peeler, a handle; a blade support portion thereon having an opening of square cross section therethrough; a U-shaped blade removably positioned in the opening, said blade including legs engageable for part of their lengths against opposed walls of the opening in selected positions of adjustment longitudinally of the opening, the remaining parts of the legs projecting out of the opening to make parallel cuts in the skin of a fruit and thereby cut a strip out of said skin, the blade including a bight portion connected between the projecting parts of the legs to cut the strip away from the pulp of the fruit; and a resiliently compressible plug of square cross section removably engageable in its compressed condition in said opening to lockably engage the legs in the opening between the plug and said opposed walls.

References Cited in the file of this patent

UNITED STATES PATENTS

| | | |
|---|---|---|
| 561,842 | Wilks | June 9, 1896 |
| 1,771,296 | Harley et al. | July 22, 1930 |
| 2,054,480 | Leitshuh | Sept. 15, 1936 |
| 2,427,123 | Catellier | Sept. 9, 1947 |
| 2,546,032 | Holmberg | Mar. 20, 1951 |